United States Patent
Li

(10) Patent No.: US 9,577,432 B2
(45) Date of Patent: Feb. 21, 2017

(54) ADVANCED ENERGY MONITORING AND CONTROL IN A COMPLEX SYSTEM

(71) Applicant: The Boeing Company, Seal Beach, CA (US)

(72) Inventor: Sherwin C. Li, Seattle, WA (US)

(73) Assignee: The Boeing Company, Chicago, IL (US)

( * ) Notice: Subject to any disclaimer, the term of this patent is extended or adjusted under 35 U.S.C. 154(b) by 740 days.

(21) Appl. No.: 13/963,040

(22) Filed: Aug. 9, 2013

(65) Prior Publication Data

US 2015/0045976 A1    Feb. 12, 2015

(51) Int. Cl.
*H02J 4/00* (2006.01)
*G01D 4/00* (2006.01)
(Continued)

(52) U.S. Cl.
CPC ............... *H02J 4/00* (2013.01); *B60L 1/006* (2013.01); *G01D 4/002* (2013.01); *H02J 1/14* (2013.01);
(Continued)

(58) Field of Classification Search
CPC ...... H02J 4/00; H02J 13/0017; H02J 13/0096; H02J 13/0075; H02J 3/14; H02J 1/14; B60L 1/006; B60L 2200/10; G01D 4/002; Y02T 90/16; B64D 2221/00
(Continued)

(56) References Cited

U.S. PATENT DOCUMENTS 5,423,808 A * 6/1995 Edwards ................ A61B 18/12
                                                      606/34
5,637,933 A    6/1997 Rawlings et al.
(Continued)

FOREIGN PATENT DOCUMENTS

EP    2001104 A2    12/2008
EP    2166636 A2    3/2010
(Continued)

OTHER PUBLICATIONS

"True, Reactive, and Apparent Power," Chapter 11—Power Factor, EETech Media, LLC, no date.*
(Continued)

*Primary Examiner* — M. N. Von Buhr
(74) *Attorney, Agent, or Firm* — Womble Carlyle Sandridge & Rice LLP

(57) ABSTRACT

A system includes a plurality of smart outlets and a backend system in wireless communication with the smart outlets. The smart outlets are configured to provide electrical power from an electrical system to respective power loads, and configured to measure power consumption characteristics thereof the respective power loads. The power consumption characteristics may include real power, apparent power or a combination thereof consumed by the respective power loads. The backend system may be configured to wirelessly receive the power consumption characteristics from the smart outlets for analysis in accordance with a power distribution schedule of the electrical system, and wirelessly transmit a command signal to one or more of the smart outlets in various instances response to the analysis. This command signal may instruct the respective one or more smart outlets to shed or restore power to respective power loads from the electrical system.

20 Claims, 7 Drawing Sheets

(51) Int. Cl.
*B60L 1/00* (2006.01)
*H02J 1/14* (2006.01)
*H02J 3/14* (2006.01)
*H02J 13/00* (2006.01)

(52) U.S. Cl.
CPC .............. *H02J 3/14* (2013.01); *H02J 13/0017* (2013.01); *H02J 13/0075* (2013.01); *H02J 13/0096* (2013.01); *B60L 2200/10* (2013.01); *B64D 2221/00* (2013.01); *Y02T 90/16* (2013.01)

(58) Field of Classification Search
USPC ...................................... 700/295; 340/870.02
See application file for complete search history.

(56) References Cited

U.S. PATENT DOCUMENTS

| | | | | |
|---|---|---|---|---|
| 5,722,975 | A * | 3/1998 | Edwards | A61B 18/12 606/34 |
| 6,476,729 | B1 * | 11/2002 | Liu | G01R 31/42 340/12.39 |
| 7,626,798 | B2 | 12/2009 | Rusan et al. | |
| 8,049,360 | B2 | 11/2011 | Karimi et al. | |
| 8,344,912 | B2 | 1/2013 | Mitchell et al. | |
| 8,761,944 | B2 * | 6/2014 | Drew | G05B 13/00 307/35 |
| 2007/0164156 | A1 | 7/2007 | Henley et al. | |
| 2008/0303353 | A1 * | 12/2008 | Yu | H02J 13/0003 307/131 |
| 2009/0219145 | A1 * | 9/2009 | Wong | G01D 4/002 340/286.02 |
| 2010/0133907 | A1 * | 6/2010 | Galasso | H02J 1/14 307/39 |
| 2010/0271226 | A1 * | 10/2010 | Holbery | G01D 4/002 340/657 |
| 2011/0046792 | A1 * | 2/2011 | Imes | F24F 11/0086 700/278 |
| 2011/0202185 | A1 * | 8/2011 | Imes | H04L 43/08 700/277 |
| 2011/0266864 | A1 | 11/2011 | McAvoy | |
| 2011/0320828 | A1 * | 12/2011 | Boss | G06F 1/3209 713/300 |
| 2012/0065790 | A1 | 3/2012 | Boy | |
| 2012/0158327 | A1 * | 6/2012 | Hurri | G06Q 50/06 702/62 |
| 2012/0173033 | A1 * | 7/2012 | Tischer | H02J 3/14 700/295 |
| 2012/0200418 | A1 | 8/2012 | Hirosaka | |
| 2012/0253881 | A1 * | 10/2012 | Schneider | G06Q 50/06 705/7.28 |
| 2013/0015714 | A1 * | 1/2013 | Kwok | H02J 1/10 307/75 |
| 2014/0191848 | A1 * | 7/2014 | Imes | H04B 5/0037 340/10.5 |
| 2014/0325245 | A1 * | 10/2014 | Santini | H02J 1/14 713/300 |

FOREIGN PATENT DOCUMENTS

| | | |
|---|---|---|
| EP | 2431277 A2 | 3/2012 |
| WO | 2012003404 A1 | 1/2012 |

OTHER PUBLICATIONS

Emanuel, Alexander Eigeles, "Summary of IEEE Standard 1459: Definitions for the Measurement of Electric Power Quantities Under Sinusoidal, Nonsinusoidal, Balance, or Unbalanced Conditions," IEEE Transactions on Industry Applications, v.40, No. 3, pp. 869-876, May/Jun. 2004.*

Emanuel, Alexander Eigeles, "On the Definition of Power Factor and Apparent Power in Unbalanced Polyphase Circuits with Sinusoidal Voltage and Currents," IEEE Transactions on Power Delivery, v.8, No. 3, pp. 841-852, Jul. 1993.*

Filipski, Sr., P.S., "Polyphase Apparent Power and Power Factor Under Distorted Waveform Conditions," IEEE Transactions on Power Delivery, v.6, No. 3, pp. 1161-1165, Jul. 1991.*

Ma et al., "Modeling the Colored Background Noise of Power Line Communication Channel Based on Artificial Neural Network," copyright 2012, 978-1-4244-7596-4/10 IEEE, 4 pages.

Song et al., "Linear Local Data Fusion for Sequential Test," copyright 2012, 978-1-4673-0658-4/12 IEEE, pp. 0416-0420.

Extended European Search Report for EP14180035.9-1804; Jan. 20, 2015.

Canadian Examination Report dated Nov. 26, 2015 for Application No. 2,855,085.

European Examination Report dated Mar. 8, 2016 for Application No. 14 180 035.9.

* cited by examiner

ADVANCED ENERGY MONITORING AND CONTROL IN A COMPLEX SYSTEM

TECHNOLOGICAL FIELD

The present disclosure relates generally to energy management and, in particular, to advanced energy monitoring and control of an electrical system of a complex system such as an aircraft.

BACKGROUND

Complex systems, such as aircraft, incorporate many devices that consume electrical power. A challenge is presented when a system may be supported by a power source capable of supplying a maximum amount of power and, at certain points during system operation, the devices may require more than the maximum amount of available power. Some devices may only require power at certain times. Unfortunately, many devices that may only require power intermittently or periodically may seek to consume power at the same time that other devices also require power, thereby resulting in an aggregate power demand in excess of an available supply.

Conventionally, when the demand for power exceeds the available supply, some devices seeking power may not be provided power and some devices currently being provided power may be cut off. Devices may be assigned priority so that devices that may be considered important may not be shut down or may be among the last to be shut down. For example, among aircraft systems, environmental control systems may be accorded a higher priority than galley appliances or on-board entertainment systems. As a result, when the demand for power exceeds the available supply of power, the galley appliances and on-board entertainment systems may be shut down before the environmental control systems may be shut down.

In a number of systems, many devices to which power may be supplied are nonlinear devices (capacitive and inductive) that simultaneously consume both real and reactive power. These include many consumer electronics such as cameras, portable music players (e.g., MP3 players), mobile phones, smartphones, tablet computers, laptop computers and the like. Addressing these devices may be even more challenging in that the number of such devices consuming power may constantly changes. Conventional power distribution systems may be responsive to present demands, but lack real-time power consumption characteristics from loads such as these to provide efficient energy production.

Therefore, it may be desirable to have a system and method that takes into account at least some of the issues discussed above, as well as possibly other issues.

BRIEF SUMMARY

Example implementations of the present disclosure are generally directed to a system, smart outlet and method for advanced energy monitoring and control of an electrical system such as that of a complex system like an aircraft. Example implementations may improve the energy (and fuel) efficiency on many complex systems, and particularly on future electrical complex systems. Example implementations include smart outlets configured to sense real-time power consumption characteristics, such as real power, reactive power, apparent power and the like, from which a power distribution schedule may be implemented so that capacity at least meets consumption demands. This may enable more efficient power generation due to a number of factors, such as matched load characteristics (real/reactive power), and reduction of excess energy production and waste.

The smart outlet of example implementations may employ wireless communication with an appropriate electrical load management system (ELMS) to avoid the addition of significant extra weight. The smart outlet may also provide advanced power conditioning to increase the operational life of loads plugged into it. The smart outlet may be manufactured with a form factor similar to a conventional outlet to reduce the impact on existing manufacturing processes of the complex system.

According to one aspect of example implementations, a system is provided that includes a plurality of smart outlets and a backend system in wireless communication with the smart outlets. The smart outlets are configured to provide electrical power from an electrical system to respective power loads, and configured to measure power consumption characteristics of the respective power loads. The power consumption characteristics may include real power, apparent power or a combination thereof consumed by the respective power loads; and in some examples may further include voltage and current consumed by the respective power loads. The backend system may be configured to wirelessly receive the power consumption characteristics from the smart outlets for analysis in accordance with a power distribution schedule of the electrical system, and wirelessly transmit a command signal to one or more of the smart outlets in various instances response to the analysis. This command signal may instruct the respective one or more smart outlets to shed or restore power to respective power loads from the electrical system.

In some examples, the smart outlets may be configured to provide power conditioning and/or surge protection to the respective power loads.

In some examples, each smart outlet may include one or more sensors coupled to a control unit, which is in turn coupled to a wireless communication interface. The sensor (s) may be configured to measure the power consumption characteristics of a respective power load to which the smart outlet is configured to provide electrical power, and may include a voltage sensor and a current sensor. The control unit may be configured to control the electrical power provided to the respective power load, and receive the power consumption characteristics measured by the one or more sensors. And the wireless communication interface may be configured to wirelessly transmit the power consumption characteristics to the backend system.

In some examples, each smart outlet may further include a power socket, and a switch coupled to the control unit and between the electrical system and power socket. In these examples, the power socket may be configured to provide an interface for electrical power provided from the electrical system to the respective power load, and the control unit may be configured to control the switch to thereby control the electrical power provided to the respective power load. And in some examples, each smart outlet may be configured to finite impulse response filter the power consumption characteristics before wireless transmission thereof.

In some examples, the backend system may be configured to provide the power consumption characteristics to an electrical load management system (ELMS) for the analysis in accordance with the power distribution schedule, and configured to receive the command signal from the ELMS for transmission to the one or more smart outlets.

In some examples, the backend system may be configured to receive and integrate the power consumption characteristics into a representation thereof for the analysis in accordance with the power distribution schedule. In some further examples, the backend system may be more particularly configure to assign the power consumption characteristics to various ones of N clusters for respective N power levels, and calculate a discrete probability of each of the N power levels from respective clusters.

In other aspects of example implementations, a smart outlet and method are provided for advanced energy monitoring and control of an electrical system. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
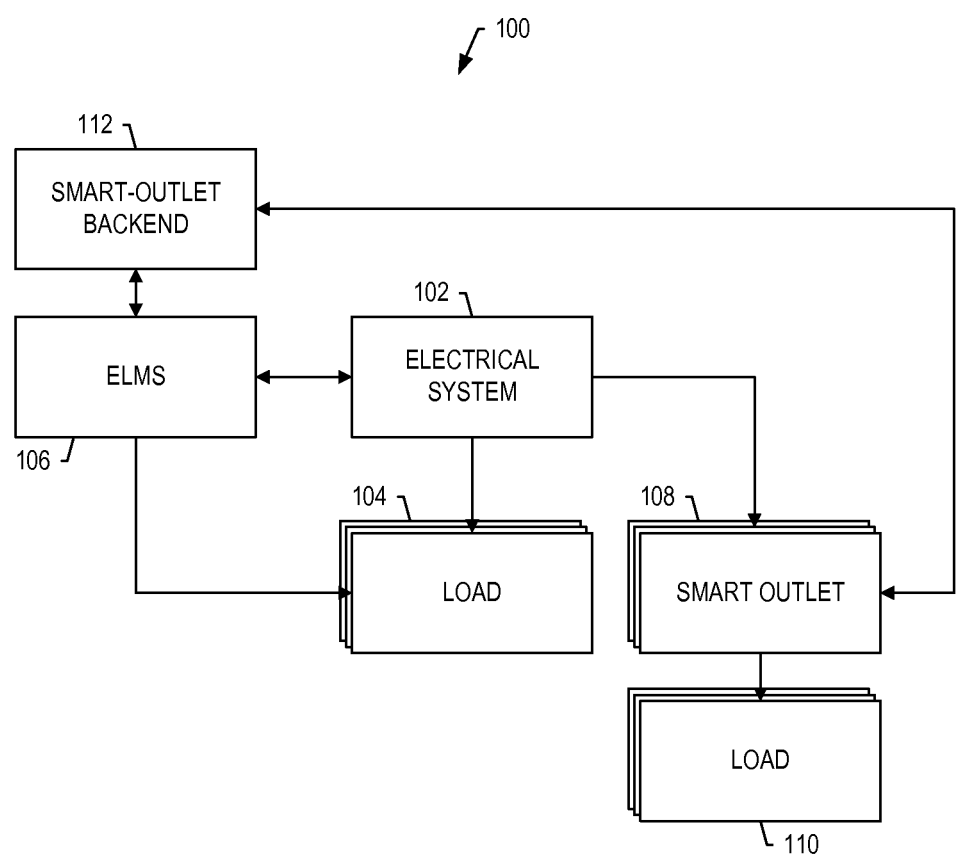
FIG. 1 illustrates an electrical power generation, distribution and consumption system according to one example implementation of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

Example embodiments of the present disclosure relate generally to energy management and, in particular, to advanced energy monitoring and control of an electrical system of a complex system such as an aircraft. Example embodiments may be described herein with reference to an electrical system onboard an aircraft. It should be understood that example embodiments may be equally applicable electrical systems of other complex systems, manufacturing/factory facilities, vehicles or the like, both in and out of the aerospace industry.

Referring now to FIG. 1, an electrical power generation, distribution and consumption system 100 is illustrated according to example implementations of the present disclosure. The system may include any of a number of different subsystems for performing one or more functions or operations with respect to an electrical system and one or more power (electrical) loads for a complex system such as an aircraft. As shown, for example, the system may include an electrical (power) system 102 coupled to a plurality of first power loads 104, and include an electrical load management system (ELMS) 106 coupled to the electrical system and first power loads. The electrical system may also be coupled to one or more smart outlets 108 into which one or more second power loads 110 may be plugged or otherwise coupled. The smart outlets may be coupled to a backend system 112, which may in turn be coupled to the ELMS.

It should be understood that while the electrical system 102, first and second power loads 104, 110, ELMS 106, smart outlets 108 and backend system 112 are shown as part of the electrical power generation, distribution and consumption system 100, one or more of the respective subsystems may instead be separate from but in communication with the electrical power generation, distribution and consumption system. It should also be understood that one or more of the subsystems may function or operate as a separate system without regard to others of the subsystems. Moreover, although shown as separately, in some examples, one or more smart outlets or the ELMS may include the backend system or its functionality, and the system may not have a separate backend system. And it should be understood that the electrical power generation, distribution and consumption system may include one or more additional or alternative subsystems than those shown in FIG. 1.

The electrical system 102 may be generally configured to generate and distribute electrical power to the first loads 104, and the ELMS 106 may be configured to monitor and control aggregate power capacity and consumption, and generate or otherwise implement a power distribution schedule for the electrical system so that capacity at least meets consumption demands.

In accordance with example implementations of the present disclosure, electrical power generated by the electrical system 102 may also be distributed to the smart outlets 108, which may in turn provide the electrical power to second loads 110 plugged into or otherwise coupled to the smart outlets. In some examples in the context of an aircraft or other passenger-carrying complex system, the smart outlets may be distributed at passenger seats, and may be particularly beneficial for use with consumer electronics of passengers during operation of the complex system. A smart outlet may be configured to provide advanced power conditioning and/or surge protection to a second load.

The smart outlet 108 may also be configured to measure power consumption characteristics of a second load 110, such as one or more of voltage, current, frequency, real power, reactive power, apparent power or the like. And the smart outlet may be configured to wirelessly transmit the power consumption characteristics to the backend system 112, which may in turn wirelessly receive the power consumption characteristics.

The backend system 112 may process the power consumption characteristics (of a second load 110) from a smart outlet 108 and communicate the processed power consumption characteristics to the ELMS 106 for analysis in accordance with the power distribution schedule of the electrical system 102. In some instances, ELMS may generate and provide to the smart outlet, a command signal in response to the analysis. The command signal may instruct the smart outlet to shed power to the second load, or may instruct the smart outlet to restore power to the second load. In some examples, the ELMS may provide the command signal to the backend system, which may wirelessly transmit the command signal to the smart outlet to shed or restore power to the second load in accordance with the command signal.

Figure 2:
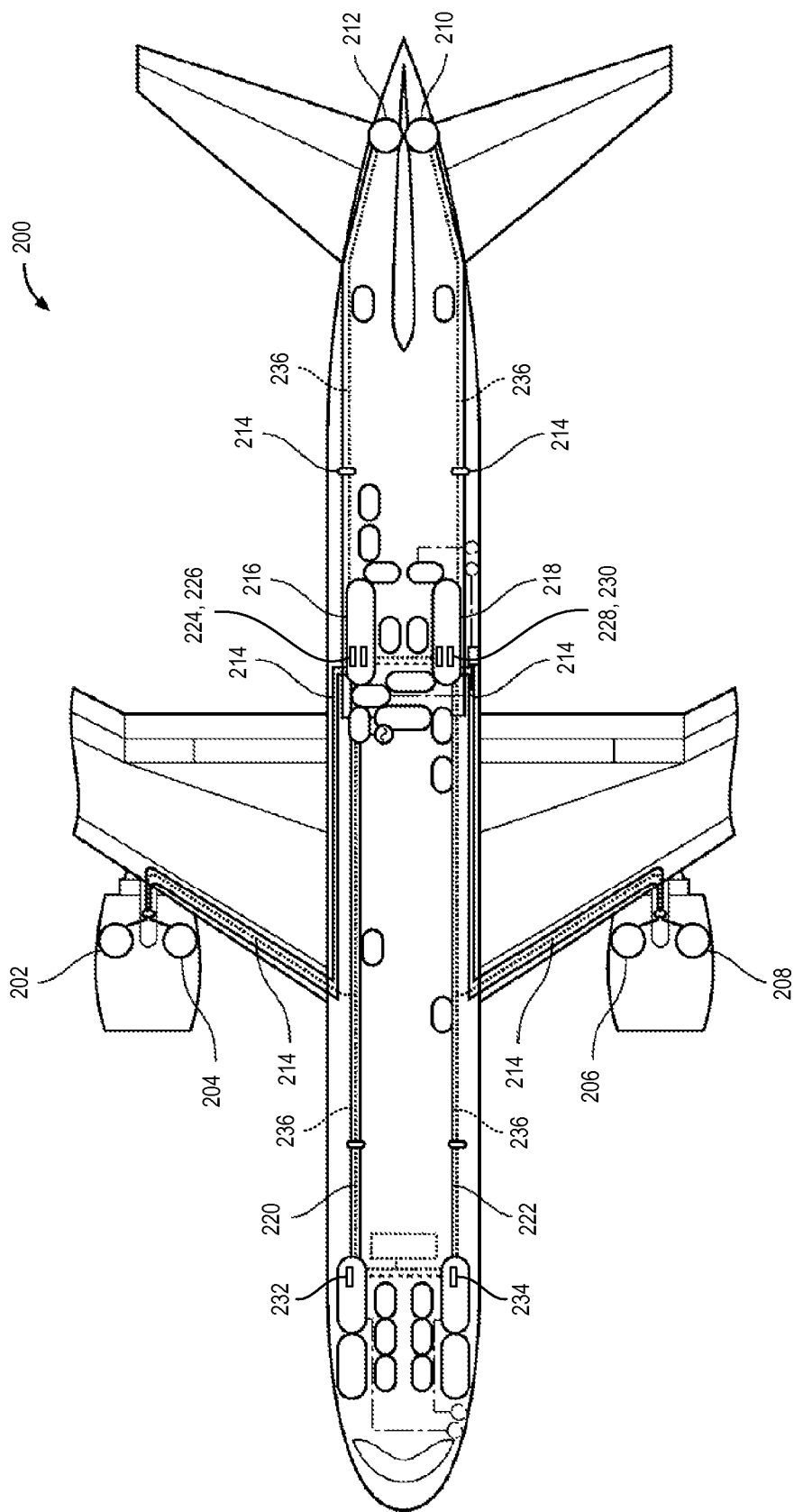
FIG. 2 is an illustration of an aircraft showing exemplary locations of power generators, power distribution lines and power loads of an electrical system of the aircraft, according to example implementation of the present disclosure.

FIG. 2 is an illustration of an electrical system 200 of an aircraft showing example locations of power generators, power distribution lines and power loads, and which in some examples may correspond to the electrical system 102 of FIG. 1. The electrical system 200 may include a plurality of power sources such as power generators, power units, batteries and the like. As shown in FIG. 2, examples of suitable power generators include first and second right-engine generators 202, 204, first and second left-engine generators 206, 208, left and right auxiliary power units (APUs) 210, 212, and the like. The electrical system may include a high-voltage AC bus 214 (e.g., 235 volts) coupled to the power generators. One or more auto transformer units (ATUs) 216 may be configured to transform AC current from the high-voltage AC bus to a low-voltage AC bus 220 (e.g., 115 volts), and one or more transformer rectifier units (TRUs) 218 may be configured to transform AC current from the high-voltage AC bus to a low-voltage DC bus 222 (e.g., 28 volts).

The electrical system 200 may include a number of generator control units (GCUs) such as first and second right GCUs 224, 226 and first and second left GCUs 228, 230 coupled to respective ones of right-engine generators 202, 204 and first and second left-engine generators 206, 208. Each GCU may be configured to monitor the operational state of a respective generator and control its connection to the electrical system accordingly. For example, a GCU may monitor a generator, and in response to detecting failure of the generator, may control its removal or isolation from the electrical system.

The electrical system 200 may also include a number of bus power control units (BPCUs) such as right and left BPCUs 232, 234 coupled to the high-voltage AC bus 214. In one example, the BPCUs may be coupled to the high-voltage AC bus via respective bus bars at power distribution panels, and which in some examples each of the right-engine generators 202, 204 and left-engine generators 206, 208 may be coupled to a respective bus bar. The BPCUs may be configured to switch power between the bus bars to redistribute power to various components of the electrical system, such as in response to failure and resulting isolation of a generator from the electrical system.

The right GCUs 224, 226 and left GCUs 228, 230, right and left BPCUs 232, 234 and various other components of the electrical system 200 may be connected to a common data network (CDN) 236. The CDN may enable communication between the components, and perhaps also a common core system (CCS) of the aircraft. The CCS may be an aircraft system that has software applications and common processors to calculate data to operate many aircraft system functions. The CCS may have the functions to monitor and to control the electrical system, and may also process system data for the aircraft's head-down displays.

Figure 3:
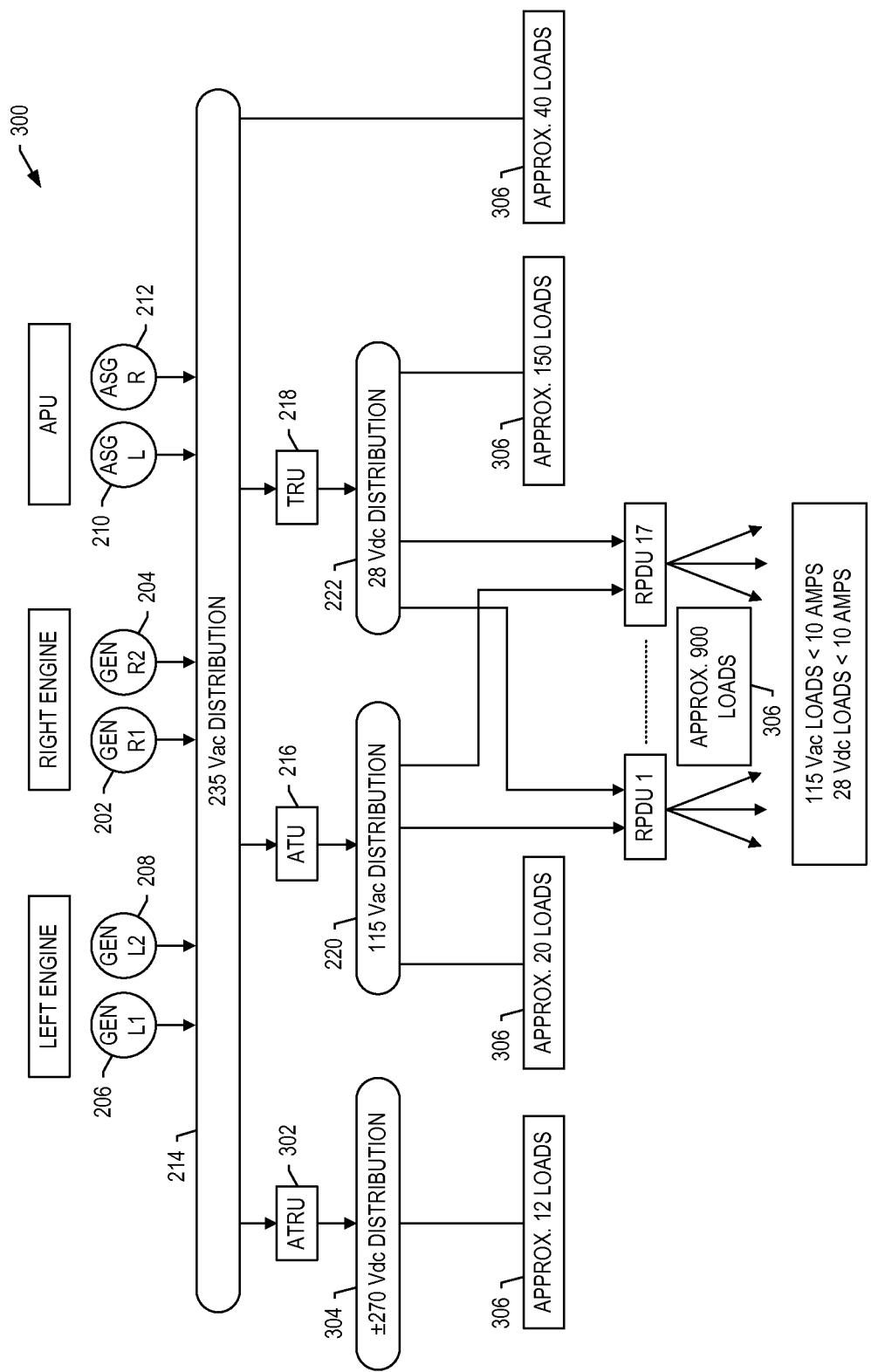
FIG. 3 is an illustration of an exemplary functional diagram of an electrical architecture of the electrical system of FIG. 2 according to example implementation of the present disclosure.

FIG. 3 is an illustration of an example functional diagram of an electrical architecture 300 of the electrical system 200 of FIG. 2, according to an example implementation of the present disclosure. As shown, the electrical architecture includes the power generators 202-212, high-voltage AC bus 214, one or more ATUs 216, one or more TRUs 218, low-voltage AC bus 220 and low-voltage DC bus 222. The electrical architecture also includes an auto transformer rectifier unit (ATRU) 302 coupled to a high-voltage DC bus 304. One or more of the high-voltage AC bus, low-voltage AC bus, high-voltage DC bus or low-voltage DC bus may be coupled to a plurality of loads 306 (e.g., first loads 104). The low-voltage AC bus and low-voltage DC bus may also be coupled to one or more remote power distribution units (RPDUs) (e.g., RPDU 1, . . . , RPDU 17), which may in turn be coupled to loads.

In various example implementations, various loads 306 and parts may be used. Examples of suitable parts include an electrical component, fuse, switch, power line, actuator, effector, power supply, replacement part, nitrogen generating system (NGS) and the like.

The loads 306 may include any of a number of different types of loads, and may be distributed in any of a number of different manners. For example, the high-voltage AC bus 214 may be coupled to loads such as wing ice protection, hydraulic AC, motor pump, fuel pumps, galley ovens, cargo heaters, environmental control system (ECS) recirculation fans and the like. The low-voltage AC bus 220 may be coupled to loads (e.g., <10 amps) such as ECS lavatory/galley fans, equipment cooling, fans, window and the like. Similarly, the low-voltage DC bus 222 may be coupled to loads (e.g., >10 amps) such as DC fuel pumps, igniters, flight deck displays, right GCUs 224, 226, left GCUs 228, 230, BPCUs 232, 234 and the like. And the high-voltage DC bus 304 may be coupled to adjustment speed motors, such as a hydraulic electric motor pump (EMP), NGS, ECS compressors, ECS fans, engine start and the like.

In some examples, the BPCUs 232, 234 may be configured to implement an ELMS configured to monitor and control aggregate power capacity and consumption, and generate or otherwise implement a power distribution schedule so that capacity at least meets consumption demands of the electrical system 200. In some examples, the BPCUs may utilize the CDN 236 to communicate with the right GCUs 224, 226, left GCUs 228, 230 and RPDUs, as well as secondary power distribution units (SPDUs), electrical load control units (ELCUs) and other system controllers to accomplish various ELMS functions. In some examples, at least some of the loads and/or RPDUs may include, for example, solid-state power controllers (SSPCs) configured to control voltages to respective loads in response to commands from the BPCUs or CCS through the CDN. The RPDUs may include a number of gateway RPDUs that connect directly to the CDN to interface with the CCS. The gateway RPDUs may act as the communication interface between the CDN and other, standard RPDUs. The gateway RPDUs may supply voltages to the standard RPDUs, and may send controls to the standard RPDUs through a private time-triggered protocol/class C (TTP/C) network.

Figure 4:
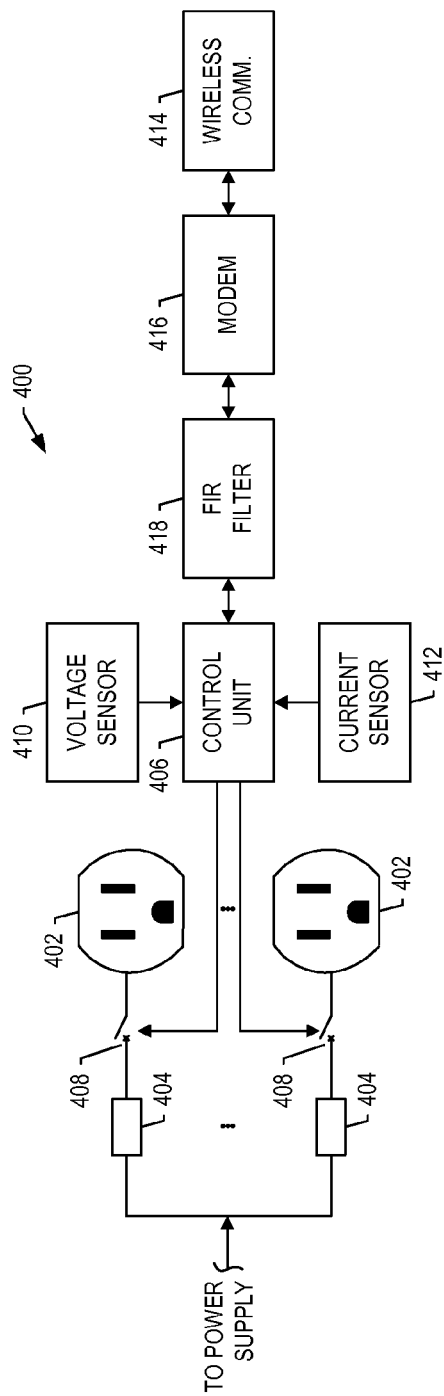
FIGS. 4 and 5 illustrate respective ones of a suitable smart outlet and a suitable backend system, according to example implementations.

FIG. 4 is an illustration of a smart outlet 400 that in some examples may correspond to the smart outlet 108 of FIG. 1. As shown, the smart outlet may include one or more power sockets 402 coupled to a power supply such as an electrical system (e.g., electrical system 102, 200). The power socket may be configured to receive the power plug of a power load (e.g., second power load 110), and thereby provide an interface for the power from the power supply to the load. The power socket (and thus power plug) may be any of a number of different types of sockets. Examples of suitable types of power sockets include NEMA-type sockets, CEE-type sockets and the like. Other examples of suitable types of power sockets include cigarette-lighter receptacles, USB receptacles, Firewire receptacles, Thunderbolt receptacles and the like. Likewise, the power load may be any of a number of different types of electronics configured to consume power, although example implementations may be particularly useful for consumer electronics that may be used during operation of a complex system, such as by, passengers of an aircraft or other passenger-carrying complex system. Examples of suitable power loads include cameras, portable music players (e.g., MP3 players), mobile phones, smartphones, tablet computers, laptop computers and the like.

In some examples, the smart outlet 400 may include circuitry 404 between the power sockets 402 and power supply, and configured to provide advanced power conditioning and/or surge protection to power loads. The circuitry may include surge protection to protect power loads from sudden high induced-current surge. In some examples, the circuitry may include metal-oxide varistors (MOV) electrically connected between current-carrying (hot) and neutral/ground lines of the connection between the power sockets and power supply. A MOV has a variable resistance that depends on voltage levels. When the voltage exceeds certain level, the MOV may have a much lower resistance to enable it to pass a large amount of current to ground.

In addition to or in lieu of surge protection, the circuitry 404 may include for example, a small choke (e.g., toroidal coil) that may be electrically connected to the current-carrying line. This electromagnetic device is essentially an inductor (coils of wires) and may eliminate high-frequency fluctuations (noise) in the current, and may improve power quality and/or extend operational lifetime of power loads.

The smart outlet 400 may include a control unit 406 configured to control the supply of power to the sockets 402, and thereby the supply of power to power loads plugged into the sockets, and thereby shed or restore power to the power loads. In some examples, the control unit may be coupled to and configured to control one or more switches 408 each of which may be coupled between a respective power socket 402 and the power supply, on either side of any circuitry 404. Each switch may be controllable off or on to correspondingly switch off or on the supply of power to a respective power socket. In some examples, the switch may be an electronic circuit breaker, although any of a number of other types of switches may be used instead. Moreover, although not separately shown in FIG. 4, in some examples, the smart outlet further include advanced power conditioning circuitry and/or surge protection circuitry in line with each of the switches, which may benefit loads plugged into respective sockets.

Control of the supply of power to a socket 402 may depend on power consumption characteristics of the load plugged into the socket, or one or more other loads plugged into sockets of the same or other smart outlets 400. The smart outlet may therefore include one or more sensors coupled to the control unit 406 and configured to measure one or more power consumption characteristics such as one or more of voltage, current, frequency, real power, reactive power, apparent power or the like. As shown, for example, the smart outlet may include one or more voltage sensors 410, one or more current sensors 412 and the like. The voltage sensor may be configured to measure a voltage across terminals of each of one or more plugs into respective sockets; and in one example, the voltage sensor may include a resistor divider with band-pass noise filter circuitry. The current sensor may be configured to measure a current through one or more loads plugged into respective sockets; and in one example, the current sensor may include a shunt resistor placed in series with the load.

In some examples, the voltage and current sensors 410, 412 may be configured to measure voltage and current waveforms (and thus frequency) simultaneously, and the control unit 406 may be configured to calculate real and reactive power consumed by one or more loads based on the measurements, such as in accordance with any of a number of different known techniques. The apparent power may be calculated as the magnitude of the vector sum of the real power and reactive power, or the product of the root-mean-square of the voltage and current.

In some examples, the consumption characteristics may be analyzed at a location remote from the smart outlet 400, and control signals from the remote location may direct control of the supply of power to sockets 402 of the smart outlet. In some examples, the remote location may be an ELMS (e.g., ELMS 106) in communication with the smart outlet via an appropriate backend system (e.g., backend system 112). The smart outlet may therefore also include a communication interface such as a wireless communication interface 414 coupled to the control unit 406 and configured to transmit and/or receive information such as consumption characteristics, control signals and the like. The wireless communication interface may be configured to communicate in accordance with any of a number of different wireless techniques. Examples of suitable wireless techniques include Wi-Fi®, WiMAX®, wireless personal area networks (WPANs) such as IEEE 802.15, Bluetooth®, low power versions of Bluetooth®, infrared (IrDA), ultra wideband (UWB), Zigbee® and the like. Other examples of suitable wireless techniques include any of a number of different cellular technologies such as 3rd Generation (3G), 3.9G, 4th Generation (4G) technologies and the like. One example of a suitable 4G cellular technology is 4G Long Term Evolution (LTE).

In some examples, each smart outlet 400 may be assigned a unique index or other identifier, which may be wirelessly transmitted to the ELMS, such as in a data packet overhead. In some examples, if no power flow is detected in the smart outlet, the smart outlet may not wirelessly transmit any data, which may improve computational efficiency of at the ELMS or backend system where data from other smart outlets may be processed, such as by eliminating empty samples and ensure the accuracy of a cluster mean (as explained below) or other similar calculation.

In some examples, the smart outlet 400 may include a modulator, demodulator or combined modem 416 to the wireless communication interface 414, The modem may be configured to modulate information such as consumption characteristics transmitted to the remote location, and demodulate information such as control signals received from the remote location. In some examples, the modem or another component may be configured to encrypt information before or after its modulation and transmission, and decrypt information after its receipt and before or after its demodulation.

In some examples it may be desirable to signal condition the consumption characteristics before their wireless transmission. In these examples, the smart outlet 400 may include (or the control unit 406 may otherwise implement) one or more signal conditioning modules such as a finite impulse response (FIR) filter 418 configured to so filter the information. In applications such as in aerospace in which electrical systems may operate at higher frequencies (e.g., electrical system 200 at 400 Hz/variable frequency), high-order FIR filtering may provide more precise removal of undesirable asynchronous noise. FIR filtering may also provide an effective means to remove sufficient noise to avoid undesirable amounts of accuracy degradation in later processing of the information. The FIR filtering may be any of a number of different types.

Figure 5:
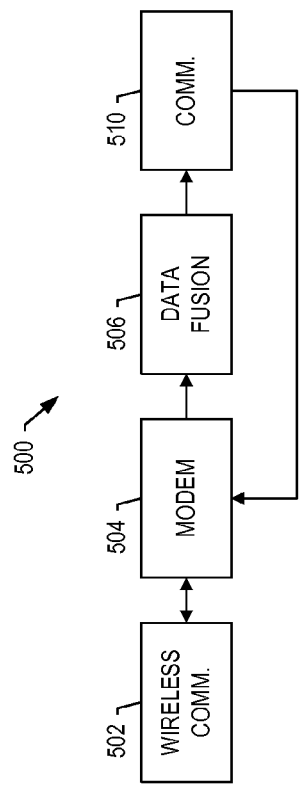

FIG. 5 is an illustration of a backend system 500 that in some examples may correspond to the backend system 112 of FIG. 1. As shown, the backend system may include a communication interface such as a wireless communication interface 502 configured to transmit and/or receive information such as consumption characteristics (e.g., voltage, current, frequency, real power, reactive power, apparent power) from one or more smart outlet (e.g., smart outlets 108, 400). The wireless communication interface may be configured to communicate in accordance with any of a number of different wireless techniques, such as those described above with respect to the wireless communication interface 414 of example smart outlet 400 (e.g., Wi-Fi®, WiMAX®, IEEE 802.15, Bluetooth®, low power versions of Bluetooth®, IrDA, UWB, Zigbee®, 3G, 3.9G, 4G).

In some examples, the backend system 500 may include a modulator, demodulator or combined modem 504 coupled to the wireless communication interface 502. The modem may be configured to demodulate consumption characteristics received from the smart outlet, and modulate control signals transmitted from the backend system back to the smart outlet. In some examples, the modem or another component may be configured to decrypt the consumption characteristics after their receipt and before or after its demodulation, and encrypt the control signals before or after their modulation and transmission.

The backend system 500 may be configured to receive consumption characteristics from a plurality of smart outlets, which for large numbers of outlets (e.g., 200-300 or more) may result in a large amount of information. In some examples, the backend system may include a data fusion module 506 configured to integrate or otherwise process the consumption characteristics into a consistent, accurate and useful representation of the consumption characteristics, which may also reduce subsequent burdens on resources processing the information without leading to a significant degradation in its accuracy.

Figure 6:
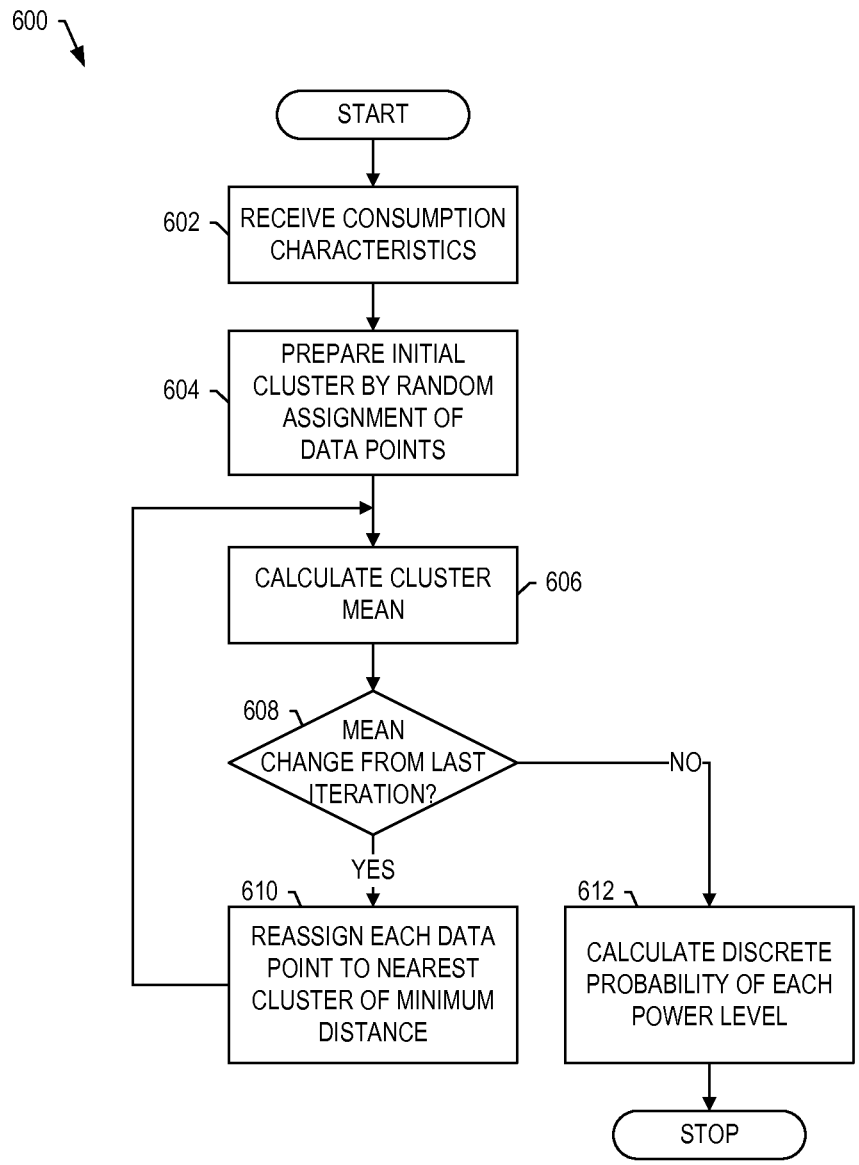
FIG. 6 is flowchart illustrating various operations in a method of processing power consumption characteristics of a plurality of loads coupled to a plurality of smart outlets according to one example implementation.

The data fusion module 506 may be configured to integrate the consumption characteristics in accordance with a number of different techniques. FIG. 6 illustrates various operations in a method 600 of integrating power consumption characteristics of a plurality of loads coupled to a plurality of smart outlets according to one example implementation of the present disclosure. As shown in block 602, the method includes receiving—or in some examples the continuous receiving of (with some sampling frequency)— consumption characteristics for establishment of $N \geq 1$ (e.g., 8) levels of each of one or more of the characteristics. The N levels of a consumption characteristic may be established in any of a number of different manners, such as according to an iterative technique in which each of the N levels may be initialized at zero or some other predetermined value.

Taking apparent power, for example, a first iteration of an iterative method may include preparing N initial clusters of data by randomly (or pseudo-randomly) assigning one or more apparent power data points to each cluster, as shown in block 604. An update value of each power level may be calculated from a respective cluster, such as by calculating the mean of the respective cluster, as shown in block 606. The updated value may be compared to the prior value, as shown in block 608. In an instance in which the updated value differs from the prior value by at least a threshold amount, one or more of the data points across the clusters may be reassigned to a nearest cluster (nearest cluster of minimum distance), as shown in block 610.

After reassignment of data points, a next iteration may commence with recalculation of an updated value of each power level (e.g., mean of each cluster). The updated value calculation, comparison and reassignment operations may repeat for each of a number of iterations until the value updated value differs from the prior value by less than the threshold amount. In this instance, the N power levels may be established at the current updated values, and the discrete probability of each power level may be calculated from their respective clusters, as shown in block 612. The probability for each power level may be utilized in a number of different manners, such as to determine one or more loads for which power may be shed in certain circumstances.

Returning to FIG. 5, the data fusion module 506 may be configured to communicate integrated power consumption characteristics from the smart outlets to an ELMS (e.g., ELMS 106), and based on which the ELMS may be configured to generate appropriate control signals to direct control of the supply of power to the smart outlets (or their sockets). In some examples, the backend system 500 may be in communication with the ELMS via its wireless communication interface 502. In other examples, the backend system may include a second (wired or wireless) communication interface 510 coupled to the data fusion module and configured to transmit the integrated power consumption characteristics to the ELMS. The control signals may be transmitted back to the smart outlets via the wireless communication interface, and in some examples may be modulated and/or encrypted by the modem 504 before their transmission to the smart outlets.

Figure 7:
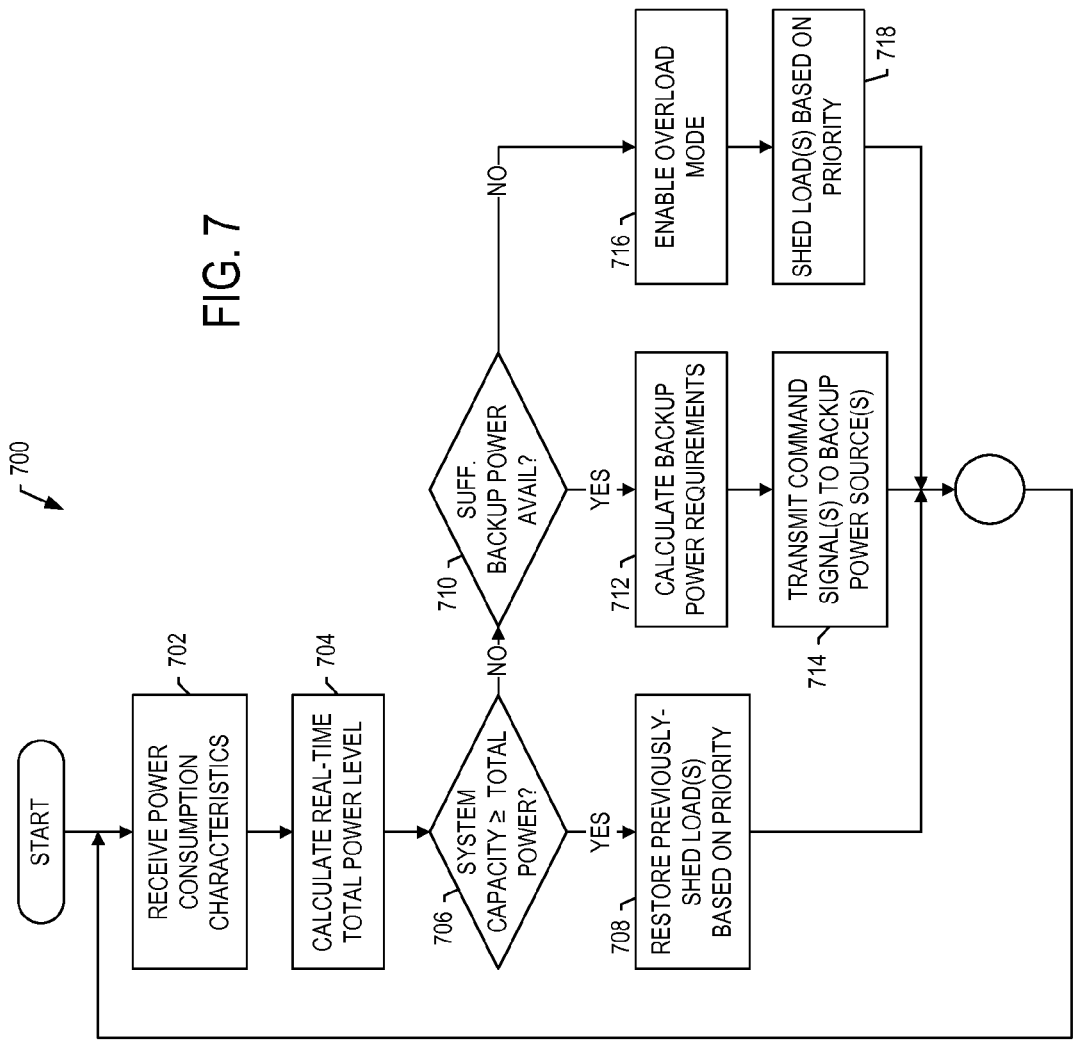
FIG. 7 is flowchart illustrating various operations in a method of monitoring and controlling power capacity and consumption of an electrical system according to one example implementation.

Returning to FIG. 1, again, the ELMS 106 may be generally configured to monitor and control aggregate power capacity and consumption of the first and second loads 104, 110, and generate or otherwise implement a power distribution schedule so that capacity at least meets consumption demands. This may include shedding or restoring power to one or more first loads, and/or according to example implementations, one or more second loads via their respective smart outlets 108. FIG. 7 illustrates various operations in a method 700 of monitoring and controlling power capacity and consumption of an electrical system 102 according to one example implementation of the present disclosure.

As shown in block 702, the method may include receiving power consumption characteristics for a plurality of loads of the electrical power generation, distribution and consumption system 100. This may include receipt—or in some examples the continuous receipt (with some sampling frequency)—of integrated power consumption characteristics for a plurality of second loads 110 received from smart outlets 108 by way of the backend system 112. And as one example, may include the probability for each of N power levels consumed by the second loads. The ELMS 106 may calculate the real-time total power level of the loads based on the received power consumption characteristics, and determine if system capacity exceeds (or is equal to) the total power level, as shown in blocks 704, 706.

The ELMS 106 may continue to receive power consumption characteristics and calculate the real-time total power level as long as the system capacity exceeds the total power level, During this time, for any prior loads to which the ELMS previously shed power, the ELMS may transmit appropriate command signals to restore those loads while keeping system capacity above the total power level, as shown in block 708. In some examples, the ELMS may select shed loads to restore based on some predetermined priority. And in some examples, this may include the ELMS transmitting command signals to one or more smart outlets to restore respective second loads 110.

In an instance in which the system capacity is less than the total power level, the ELMS 106 may determine if the system 100 includes sufficient backup power capacity (e.g., power generators, power units, batteries) to support the additional load level (the level above system capacity), as shown in block 710. In an instance in which the system does include sufficient backup power capacity, the ELMS may calculate backup power requirements, and transmit appropriate command signal(s) to backup power source(s) to supply the requisite power, as shown in blocks 712, 714.

In an instance in which the system 100 does not include sufficient backup power capacity to support the additional load level (the level above system capacity), the ELMS 106 may enable an overload mode and shed loads 104, 110 until system capacity exceeds the total power level or the system includes sufficient backup power capacity, as shown in blocks 716, 718. In some examples, the ELMS may select loads to shed based on some predetermined priority. Additionally or alternatively, for example, the ELMS may select one or more second loads to shed based on power level probabilities of the respective second loads, which as explained above, may be calculated by the backend system 112. In this regard, the ELMS may select to shed power to second loads at power levels with lower probabilities. Regardless of the manner of their selection, though, the ELMS may transmit command signals to shed power to the selected loads, perhaps including the transmission of command signals one or more smart outlets to shed power to respective second loads.

Figure 8:
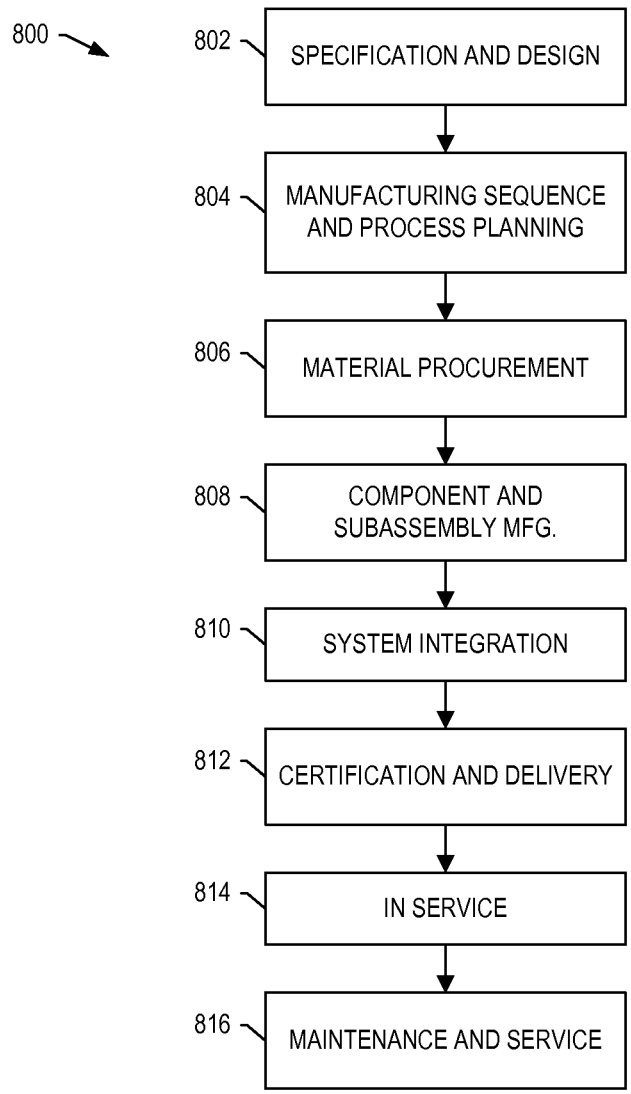
FIG. 8 is flowchart illustrating various operations in an aircraft production and service methodology according to one example implementation.
Figure 9:
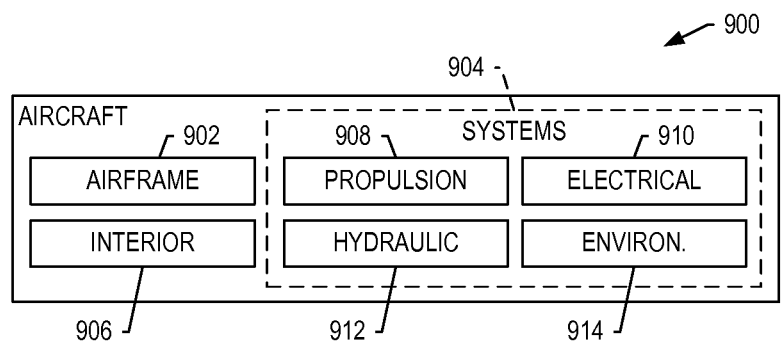
FIG. 9 is a block diagram of an aircraft according to one example implementation.

Example implementations of the disclosure may find use in a variety of potential applications, particularly in the transportation industry, including for example, aerospace, marine and automotive applications. Thus, referring now to FIGS. 8 and 9, example implementations may be used in the context of an aircraft manufacturing and service method 800 as shown in FIG. 8, and an aircraft 900 as shown in FIG. 9. During pre-production, the example method may include specification and design 802 of the aircraft, manufacturing sequence and processing planning 804 and material procurement 806. During production, component and subassembly manufacturing 808 and system integration 810 of the aircraft takes place. The disclosed system and method may be specified for use, for example, during component and subassembly manufacturing, and/or system integration.

In various examples, the disclosed system and method may be used during any one or more of the material procurement process 806, component and subassembly manufacturing process 808 or system integration 810. Thereafter, the aircraft 900 may go through certification and delivery 812 in order to be placed in service 814. While in service by a customer, the aircraft may be scheduled for routine maintenance and service 816 (which may also include modification, reconfiguration, refurbishment or the like). The system and method of example implementations may be used while the aircraft is in service, and in one example, during maintenance and service of the aircraft.

Each of the processes of the example method 800 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As shown in FIG. 9, an example aircraft 900 produced by the example method 800 may include an airframe 902 with a plurality of systems 904 and an interior 906. Examples of high-level systems 904 include one or more of a propulsion system 908, electrical system 910 (e.g., electrical system 102), hydraulic system 912, environmental system 914 or the like. Any number of other systems 904 may be included. Although an aerospace example is shown, the principles of the disclosure may be applied to other industries, such as the marine and automotive industries.

Systems and methods embodied herein may be employed during any one or more of the stages of the example production and service method 800. For example, system implementations, method implementations or a combination thereof may be utilized during the production stages 808 and 810, which may in one example enable monitoring and control of the electrical system 910. Similarly, for example, system implementations, method implementations or a combination thereof may be utilized while the aircraft 900 is in service 814 and/or during maintenance and service 816, such as to again enable monitoring and control of the electrical system. This may in turn substantially reduce the cost of an aircraft 900 and/or its maintenance and service.

According to example implementations of the present disclosure, the electrical power generation, distribution and consumption system 100 and its subsystems including the electrical (power) system 102, first and second power loads 104, 110, ELMS 106, smart outlets 108 and backend system 112 may be implemented by various means. Similarly, the examples of an electrical system 200, electrical architecture 300, smart outlet 400 and backend system 500, including each of their respective elements, may be implemented by various means according to example implementations. Means for implementing the systems, subsystems and their respective elements may include hardware, alone or under direction of one or more computer program code instructions, program instructions or executable computer-readable program code instructions from a computer-readable storage medium.

In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor connected to a memory.

The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces. The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
   a plurality of smart outlets configured to provide electrical power from an electrical system to respective power loads, and configured to measure power consumption characteristics of the respective power loads, the power consumption characteristics including apparent power or a combination of apparent power and real power consumed by the respective power loads;
   a backend system in wireless communication with the smart outlets and configured to wirelessly receive the power consumption characteristics from the smart outlets, and integrate the power consumption characteristics into a representation thereof for analysis in accordance with a power distribution schedule of the electrical system, the backend system being configured to integrate the power consumption characteristics including being configured to assign the power consumption characteristics to various ones of N clusters for respective N power levels, and calculate a discrete probability of each of the N power levels from respective clusters,
   wherein the backend system is configured to wirelessly transmit a command signal to one or more of the smart outlets in various instances response to the analysis, and
   the command signal instructing the respective one or more smart outlets to shed or restore power to respective power loads from the electrical system, including in at least one instance a smart outlet being instructed to shed power to a respective power load at a power level of the N power levels with a lower discrete probability relative to others of the N power levels.

2. The system of claim 1, wherein the smart outlets are configured to provide power conditioning, surge protection or a combination thereof to the respective power loads.

3. The system of claim 1, wherein the smart outlets are configured to measure power consumption characteristics further including voltage and current consumed by the respective power loads.

4. The system of claim 1, wherein each smart outlet comprises:
   one or more sensors configured to measure the power consumption characteristics of a respective power load to which the smart outlet is configured to provide electrical power, the one or more sensors including a voltage sensor and a current sensor;
   a control unit coupled to the one or more sensors, and configured to control the electrical power provided to the respective power load, and receive the power consumption characteristics measured by the one or more sensors; and
   a wireless communication interface coupled to the control unit and configured to wirelessly transmit the power consumption characteristics to the backend system.

5. The system of claim 4, wherein each smart outlet further comprises:
   a power socket configured to provide an interface for electrical power provided from the electrical system to the respective power load; and
   a switch coupled to the control unit and between the electrical system and power socket, the control unit being configured to control the switch to thereby control the electrical power provided to the respective power load.

6. The system of claim 4, wherein each smart outlet is further configured to finite impulse response filter the power consumption characteristics before wireless transmission thereof.

7. The system of claim 1, wherein the backend system is configured to provide the power consumption characteristics to an electrical load management system (ELMS) for the analysis in accordance with the power distribution schedule, and configured to receive the command signal from the ELMS for transmission to the one or more smart outlets.

8. The system of claim 1, wherein the respective power loads are consumer electronic products, and each smart outlet includes a power socket configured to provide an interface for electrical power provided from the electrical system to a respective consumer electronic product.

9. A smart outlet configured to provide electrical power from an electrical system to a power load, the smart outlet comprising:
   one or more sensors configured to measure power consumption characteristics of the power load to which the smart outlet is configured to provide electrical power, the power consumption characteristics including apparent power or a combination of apparent power and real power consumed by the respective power load, and the one or more sensors including a voltage sensor and a current sensor;
   a control unit coupled to the one or more sensors, and configured to control the electrical power provided to the respective power load, and receive the power consumption characteristics measured by the one or more sensors; and
   a wireless communication interface coupled to the control unit and configured to wirelessly transmit the power consumption characteristics to a backend system configured to receive the power consumption characteristics from a plurality of smart outlets, and integrate the power consumption characteristics into a representation thereof for analysis in accordance with a power distribution schedule of the electrical system, the backend system being configured to integrate the power consumption characteristics including being configured to assign the power consumption characteristics to various ones of N clusters for respective N power levels, and calculate a discrete probability of each of the N power levels from respective clusters,
   wherein the wireless communication interface is further configured to wirelessly receive a command signal from the backend system in various instances response to the analysis, and
   the command signal instructing the smart outlet to shed or restore power to the respective power load from the electrical system, including in at least one instance the smart outlet being instructed to shed power to the respective power load at a power level of the N power levels with a lower discrete probability relative to others of the N power levels.

10. The smart outlet of claim 9 further comprising:
    a power socket configured to provide an interface for electrical power provided from the electrical system to the respective power load; and circuitry coupled between the electrical system and power socket, and configured to provide power conditioning, surge protection or a combination thereof to the respective power load.

11. The smart outlet of claim 9, wherein the one or more sensors are configured to measure power consumption characteristics further including voltage and current consumed by the respective power load.

12. The smart outlet of claim 9 further comprising:
a power socket configured to provide an interface for electrical power provided from the electrical system to the respective power load; and
a switch coupled to the control unit and between the electrical system and power socket, the control unit being configured to control the switch to thereby control the electrical power provided to the respective power load.

13. The smart outlet of claim 9 further comprising:
a finite impulse response filter configured to filter the power consumption characteristic before wireless transmission thereof.

14. The smart outlet of claim 9 wherein the wireless communication interface is configured to wirelessly transmit the power consumption characteristics to the backend system to provide to an electrical load management system (ELMS) for the analysis in accordance with the power distribution schedule.

15. A method performed at a smart outlet and comprising:
providing electrical power from an electrical system to a power load;
measuring power consumption characteristics of the power load to which electrical power is provided, the power consumption characteristics including apparent power or a combination of apparent power and real power consumed by the respective power load, and the power consumption characteristics being measured by one or more sensors including a voltage sensor and a current sensor;
receiving the power consumption characteristics measured by the one or more sensors;
wirelessly transmitting the power consumption characteristics to a backend system configured to receive the power consumption characteristics from a plurality of smart outlets, and integrate the power consumption characteristics into a representation thereof for analysis in accordance with a power distribution schedule of the electrical system, the backend system being configured to integrate the power consumption characteristics including being configured to assign the power consumption characteristics to various ones of N clusters for respective N power levels, and calculate a discrete probability of each of the N power levels from respective clusters; and
wirelessly receiving a command signal from the backend system in various instances response to the analysis, and
the command signal instructing the smart outlet to shed or restore power to the respective power load from the electrical system, including in at least one instance the smart outlet being instructed to shed power to the respective power load at a power level of the N power levels with a lower discrete probability relative to others of the N power levels.

16. The method of claim 15 further comprising:
providing power conditioning, surge protection or a combination thereof to the respective power load.

17. The method of claim 15, wherein measuring power consumption characteristics comprises measuring power consumption characteristics further including voltage and current consumed by the respective power load.

18. The method of claim 15 further comprising:
providing an interface for electrical power provided from the electrical system to the respective power load; and
controlling a switch between the electrical system and interface to thereby control the electrical power provided to the respective power load.

19. The method of claim 15 further comprising:
finite impulse response filtering the power consumption characteristic before wireless transmission thereof.

20. The method of claim 15, wherein the power consumption characteristics are wirelessly transmitted to the backend system to provide to an electrical load management system (ELMS) for the analysis in accordance with the power distribution schedule.

* * * * *